United States Patent

[11] 3,542,476

| [72] | Inventor | Donald D. Nord |
| | | Rochester, New York |
| [21] | Appl. No. | 704,297 |
| [22] | Filed | Feb. 9, 1968 |
| [45] | Patented | Nov. 24, 1970 |
| [73] | Assignee | Bausch & Lomb Incorporated |
| | | Rochester, New York |
| | | a corporation of New York |

[54] INTERFEROMETRIC TYPE OF LENS ALIGNMENT APPARATUS
3 Claims, 3 Drawing Figs.

| [52] | U.S. Cl. | 356/124 |
| [51] | Int. Cl. | G01b 9/00 |
| [50] | Field of Search | 356/110, 124; 350/178X; 356/172 |

[56] References Cited
UNITED STATES PATENTS
2,352,179  6/1944  Bolsey ............... 356/172X
FOREIGN PATENTS
568,128  12/1958  Canada ............... 356/110

Primary Examiner—Ronald L. Wibert
Assistant Examiner—T. Major
Attorney—Frank C. Parker ABSTRACT: A lens alignment method and apparatus of the interferometric type which utilizes the intense beam provided by a laser device for defining a reference axis and for precisely aligning a lens therewith by creating an interferometric fringe pattern in space upon reflection of said beam from the surfaces of the lens, the fringe pattern being concentric about the optical axis which connects the centers of curvature of each lens surface, the tilt of the lens being controlled by positioning the fringe pattern concentrically about the reference axis as defined by the laser beam. In the laser beam beyond the lens is arranged an electronic directional detector having a central null response point on which said beam is normally incident when the lens is not in place or when it is perfectly aligned with said beam. The directional error signal generated by the detector is fed through control circuits to two servo motors which actuate in two directions normal to each other a lens holding mechanism on which the lens is carried, the two-lateral corrective movements being thereby automatically fed to the lens so as to align its optical axis with said beam, the lens being freely and adjustably held within its stationary lens cell during the aligning process. An eyepiece is focused on said fringe pattern and a comparison reticle which is centered on said beam to indicate any tip or tilt of the lens axis.

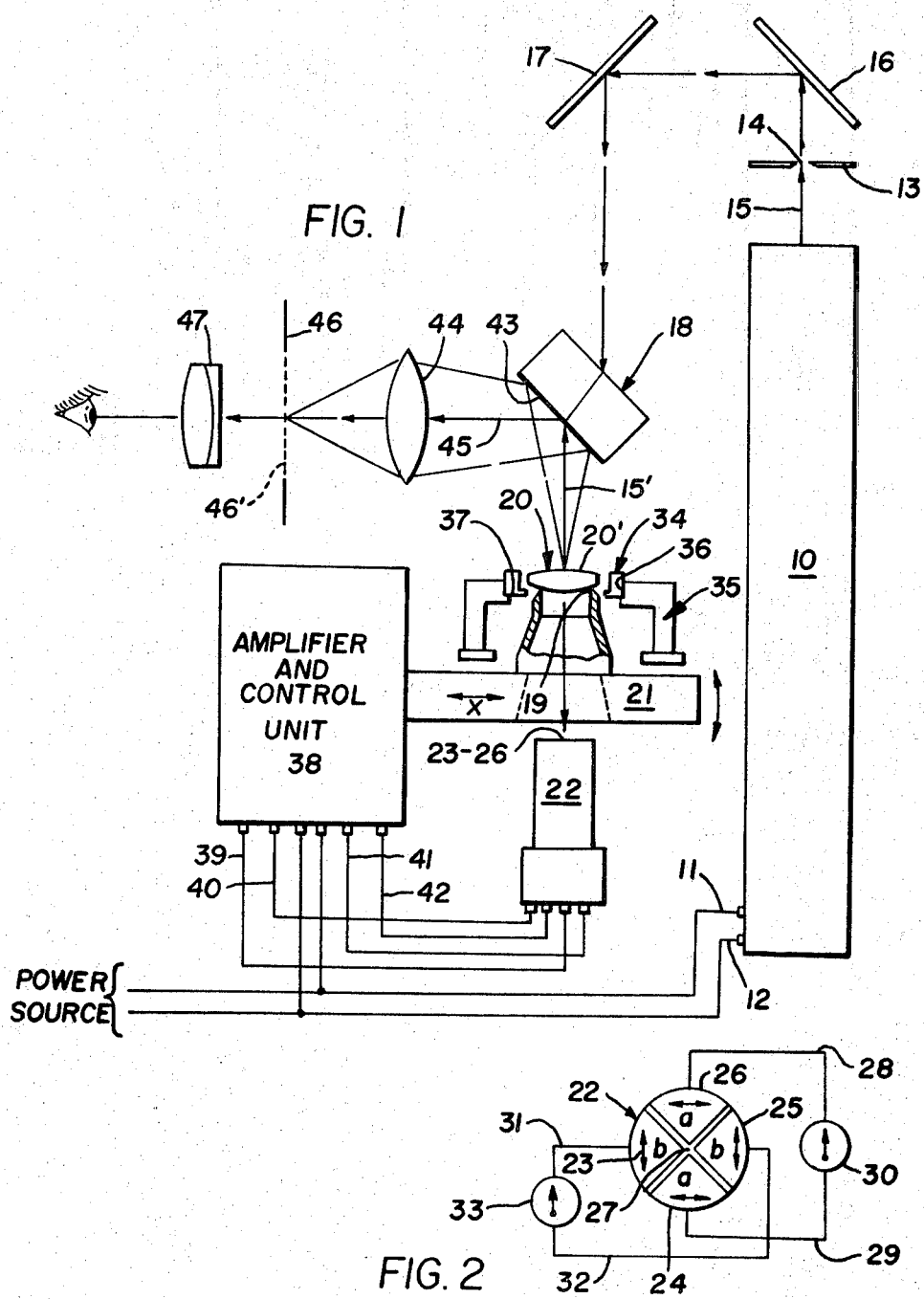

INTERFEROMETRIC TYPE OF LENS ALIGNMENT APPARATUS

BACKGROUND OF THE INVENTION

The problem of correctly alining a lens in a lens mounting has increased in importance, difficulty and cost with the development of the art to such a degree that many of the complicated and sophisticated lens systems cannot be properly assembled and tested with existing equipment. Among the better-known prior art lens alinement devices is the apparatus shown in the Bolsey U. S. PAT. No. 2,352,179 wherein a stationary light beam is deviated from a predetermined path when an incorrectly positioned lens acts on the beam. Electromechanical means are provided for centering the lens on its mounting while these elements are rotated. Another device of the kind represented by Bolsey is shown in the U.S. Pat. to Miller No. 3,324,766 but neither of these devices approach said problem in the same manner as described herebelow. In particular the lens alining device of this patent application does not require rotation of the lens and its mounting during the alinement operation.

The problem which is solved by the present invention is the precise positioning of the center of curvature of each of the refractive surfaces of a lens on a reference axis and to repetitively precisely aline successive lenses with high precision on said axis.

SUMMARY OF THE INVENTION

The present invention relates to apparatus for precisely alining a lens or lenses on a reference axis while the lens is located within its mounting mechanism, and more particularly relates to apparatus including a laser beam and interferometric optical means for determining the condition of axial alinement thereof.

In an endeavor to improve in various ways on the teachings of the prior art, it is an object of the present invention to provide a novel lens alinement apparatus for high precision alining of a lens element or elements with respect to a single optical reference axis.

It is a further object to provide such a device which is reliable in use and requires no focusing movement or rotational movement of the lens being alined A further object is to provide such a device in which the condition of alinement of the lens with the alinement axis is indicated by the coincidence of an interferometric pattern with a reticle which concentrically alined on the reference axis formed by a laser beam upon reflectance of said beam from the lens surfaces.

A still further object of the present invention is to provide such a device which automatically alines a lens or lenses with respect to a locating element on its lens mounting or cell, the element being held concentrically with a single optical reference axis which is provided by a laser beam.

Further objects and advantages will be apparent to those skilled in the art by reference to the following specification along with the accompanying drawings.

BRIEF DESCRIPTION OF THE DRAWINGS

FIG. 1 is an optical diagram showing schematically one form of the present invention;

FIG. 2 is an electrical diagram illustrating an operating portion of the invention.

DESCRIPTION OF ONE EMBODIMENT OF INVENTION

Figure 3:
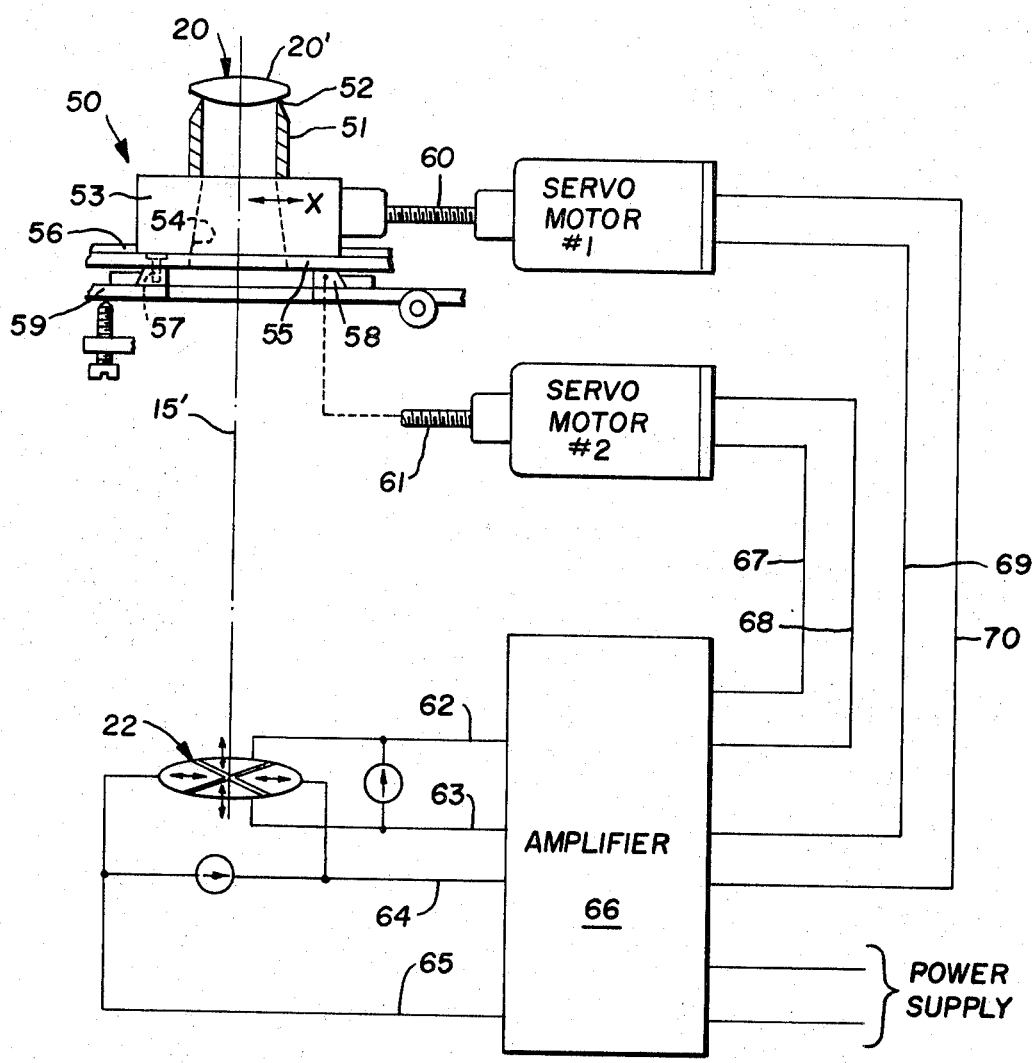
FIG. 3 is a schematic illustration of certain operating members of the invention invention.

Attention is first directed to FIG. 1 of the drawings for a general understanding of the invention. Herein in is comprised a laser light source 10 of any preferred type such as the gaseous type, although a laser light source is not strictly necessary as long as the light beam is highly coherent and strictly monochromatic. The laser 10 is defined as a light amplification by stimulated emission of radiation which is energized from a suitable power source by a pair of leads 11 and 12.

The emitted beam 15 serves as a reference axis and is passed through a diaphragm plate 13 having a very small aperture 14 therein so as to occlude the diffracted orders of light along an optical axis 15 which is defined by the beam. For the sake of compactness, the beam is deflected successively by a pair of flat mirrors 16 and 17 in a downward direction through an inclined glass plate 18 for a purpose to be described hereinafter.

In the offset axis portion 15' is located an annular lens seat 19 located approximately concentrically of said axis portion, the seat 19 serving to support a lens 20 which is to be precisely alined with axis portion 15'.

The lens 20 is secured in any preferred manner on the lens seat 19 as described herebelow and the seat is schematically represented as resting on an arm 21 or other suitable member which is movable horizontally preferably in two directions and is tiltable about two axes as well which are normal to each other and may extend parallel to said two directions as described hereinafter although other directions may be chosen. Since the supporting structure 21 for the lens seat 19 is open or hollow in the vicinity of the axis 15', the laser beam is allowed to pass therethrough to a photoresponsive electronic centration detector generally indicated at 22. By reference to FIG. 2 it will be seen that the face of the photoreceptor centration detector 22 is divided into four equal quadrants or response zones 23, 24, 25 and 26, which meet at a central null response point 27 as well known in the electronic art.

The photoelectric response of zones 26 and 24 in the direction of the arrows a–a is conducted by the leads 28, 29 to the indicator 30 so as to indicate any departure of the beam 15' from the null point 27 in direction a. Likewise the photoelectric response of zones 23, 25 in the direction of the arrows b–b is conducted by the leads 31 and 32 to the indicator 33 so as to indicate departure of the beam 15' so from the null point 27 in direction b. Before the lens 20 is placed on the lens seat 19 in the beam 15', the beam impinges on null response point 27 of the photoreceptor direction detector 22.

Since the lens seat 19 has been designated as an adjustable member, the lens cell 34 should be held stationary during alining of the lens and for this purpose, a stationary lens cell holder 35 is provided having a cylindrical seating surface 36 which is substantially centered on the optical beam axis 15'.

A horizontal seating shoulder for the lens holder 34 is also provided at 37, both surfaces 36 and 37 being so spaced that said lens stands clear of its mounting member to permit cementing of the lens into its lens cell 34 as a means of support therein.

It should be understood that the use of a lens cell is not strictly necessary for mounting the lens. If the lens cell 34 is eliminated, the lens 20 is attached directly to a mounting tube not shown, which would otherwise hold the lens cells 34, by a fast drying cement. In this case the mounting tube is held stationary while the lens cells are adjusted in position relative thereto and are successively cemented therein.

In any case, the inner seating surfaces of the lens cell 34 should be held away from the mounting edges of the lens 20 by the lens holder 35 substantially concentrically so that cement may be flowed into the interstice around the lens and thus secure it in the cell.

The necessary lateral alinement motions in directions "X" and "Y", which are normal to each other, as well as the necessary tilting motions used in alining lens 20 are provided by moving the lens holder support 21 under the control of suitable mechanism 38 which is indicated in FIG. 1 as a block labeled "control unit". The "control unit" 38 contains suitable motion mechanism to move the support arm 21 in at least the directions indicated by the arrows and is electrically connected by a proper number of leads 39, 40, 41, 42 to the centration detector 22 whereby the lateral motion of support arm 21 may be automatically controlled in response to an error signal generated by the detector.

The lens holder 21 is only symbolically shown in FIG. 1 and may be advantageously constructed in the form shown in FIG. 3 or otherwise, the important characteristics thereof being as follows:

a. Provide for linear lateral lens movement during alinement in "X" direction;
b. Provide for linear lateral lens movement during alinement in "Y" direction;
c. Provide for tilt movement of the lens about two axes lying in normal to each other; and
d. All of the aforesaid lateral motions for the lens may be accomplished either;
   a. by manual adjustment in accordance with two indicators 30, 33 which read the "X" and "Y" displacements.
   b. by automatic mechanism which is responsive to an error signal generated by directional detector.
e. The aforesaid tilt motions may be accomplished by observing the coincidence of the reflected interferometric pattern 46 which is reflected from the lens to an appropriate coincident reticle pattern 46' which is centered to the reference axis 15'. The tilt of axis 15' is adjusted by any preferred method to bring the interference pattern into coincidence with the reticle.

Means are provided for observing the aforesaid interference fringe pattern which is formed by the wave fronts which are reflected from the front and back surfaces of the lens 20. The wave fronts are reflected from the beam divider at 18 at the surface 43 through a relay lens 44 which is located on a lateral axis 45. The light rays are focused by the lens 44 at the image plane 46 whereat the interference fringe pattern is observed, said pattern being observed by an eyepiece lens 47 focused on a reticle pattern of circles 46' which are concentric with a nominal lateral reference axis 45. The fringe pattern 46 may be centered to the reticle 46' by means of the aforementioned tilt motions.

OPERATION OF THE DEVICE

With the laser light source 10 energized, the laser beam 15 is reflected by mirrors 16 and 17 onto the beam divider 18 which refracts the beam so that it emerges at an offset beam at 15'. Beam 15' is incident on and is retroreflected successively by the front and rear spherical surfaces of lens 20.

The retroreflected interference fringe pattern from the lens surfaces 20' is symmetrical about the geometrical axis which intersects the centers of curvature of both the front and rear lens surfaces.

In accordance with the principles of interferometry, the wave fronts from the two surfaces interfere with each other to form an interference fringe pattern which is observed at the image plane 46. As mentioned above, the tilt motions of the support arm 21 are then adjusted by any suitable means to bring the fringe pattern into concentricity with the reticle pattern 46'.

One of the effects of using interference rings for indicating centration is that when lack of alinement of the optical axis of the lens 20 with respect to the axis 15' is present, it appears in the field of view of the eyepiece 47 as two nonconcentric ring patterns, one from the interference pattern and the other from the reticle 46'. This two-ring type pattern of light is much easier to bring into coincidence with the reticle pattern 46' than the alternative super positioning of two light spots upon each other in the manner of the prior art. It is possible with fair certainty to control the tip of the lens axis with respect to the reference axis to an error of only ±8. seconds of arc.

The light beam 15' appears as a bright spot at 27 on the face of the photoreceptor centration detector when properly alined in the lens alinement a device and without the lens 20 being in the beam. As mentioned above, when the zero order beam is incident on the null response point 27, all of the control circuits 28, 29 and 31, 32 will be balanced and equally energized but as soon as the intense light beam moves away from the null point, an error signal is generated in one of the control circuits so as to move the lens seat 19 in such a direction as to restore the zero order beam 15' to a position at the null point 27. In fact an accuracy of repetition of centering of the lens is possible as accurately as .00001 of an inch.

In FIG. 3 of the drawings is schematically shown an automatically operated form of movable support mechanism for the lens 20, said mechanism being generally designated by numeral 50. Comprised in said mechanism is an annular support 51 whereon is formed a circular lens seat 52 similar to lens seat 19 in FIG. 1.

Effectively said mechanism 50 is a set of cross slides operating in "X" and "Y" directions normal to each other. On the uppermost slide member 53 is fixed the aforementioned annular support 51 and through the slide member 53 is formed a sight opening 54 concentrically with the support 51. Slide member 53 rests slidably on a lower plate 55 whereon slideways 56 are formed in cooperation with the slide member 53. Across the underside of the plate 55 is fixed a pair of slideways 57 and 58 which are cooperatively fitted to companion members on a stationary bottom plate 59.

Operation of the slideways 56 in direction "X" is controlled by a servomotor 01 in this form of the invention through a threaded shaft connection 60 for instance, and likewise operation of the slideways 57, 58 in direction "Y" is controlled by servomotor 02 through the threaded shaft 61.

As mentioned heretofore in connection with the structure shown in FIGS. 1 and 2, the automatic operation of the lens alinement mechanism is effected by the electronic directional detector 22 which produces a directional error signal which is conducted through leads 62, 63 and 64, 65 to an amplifier 66 and/or other power booster and from thence to the control leads 67, 68, and 69, 70.

Operation of the form of the invention shown in FIG. 3 is essentially the same as the first form above described.

In both of the described forms of the invention, the alinement of the lens 20 and/or other lens attached thereto may be accomplished manually if necessary instead of using an automatic control mechanism and in this case, the directional detector tube 22 serves only to indicate the proper alinement of the laser beam axis 15'.

I claim:

1. A precision lens alinement apparatus comprising means including a highly coherent and monochromatic light source which produces a small well collimated and substantially undiffracted light beam so as to define a reference axis:

a ring-like lens seat which is adapted to support a lens for alinement with said beam, the light wave fronts reflected from the lens surfaces forming an interference pattern in space centered on the optical axis of the lens to be alined said axis intersecting both of the centers of curvature of said lens;

a photoelectric alinement detector having a plurality of symmetrically centered sensing segments located below said seat around a central null point on which said beam normally impinges coincident with said axis, and movements of said beam away from said null point cause directional error signal in a corresponding response circuit connected to each segment;

a movable support mechanism on which said lens seat is secured, said support mechanism having an opening therethrough to freely permit passage of said beam, said support mechanism comprising a base member;

two support members mounted pivotally and concentrically within said base member for tilt movement of a lens about two axes lying substantially orthogonal to each other and to said beam; and slide means connecting said support members and base member for lateral motion of a lens in two directions substantially orthogonal to each other and to said beam.

2. A method for alining the centers of curvature of a movable lens accurately on a reference axis substantially centrally of a stationary mounting for said lens comprising the steps of:

providing a very small and coherent monochromatic light beam to act as a reference axis;

directing said beam through said lens while holding said lens within said mounting substantially centrally thereof;

producing by said beam an interference pattern from a pair of individual wave fronts which are reflected from the lens surfaces and which are centered respectively on the centers of curvature of said surfaces;

comparing the lateral alinement of said pattern relative to a contiguous reticle which is centered on said beam; and adjusting the position of said lens until said pattern is centralized with said reticle.

3. The method of claim 3 further comprising the step of: directing a portion of said beam through said lens upon photoelectric means having a plurality of sensing segments symmetrically disposed about a central null point to establish a null condition in said photoelectric means simultaneously with the centralization of said interference pattern with said reticle produced by said adjustment of said lens, to thereby verify the centralization of said lens with respect to said reference axis.